E. B. SMITH AND A. H. LOUCKS.
LUBRICATOR.
APPLICATION FILED NOV. 5, 1920.

1,385,283. Patented July 19, 1921.

E. B. Smith.
A. H. Loucks.
Inventors

By C. A. Snow & Co.
Attorneys

UNITED STATES PATENT OFFICE.

EDWIN B. SMITH AND ALBERT H. LOUCKS, OF MARION, INDIANA, ASSIGNORS TO THE MARION MACHINE, FOUNDRY AND SUPPLY COMPANY, OF MARION, INDIANA, A CORPORATION.

LUBRICATOR.

1,385,283.        Specification of Letters Patent.        Patented July 19, 1921.

Application filed November 5, 1920. Serial No. 422,061.

*To all whom it may concern:*

Be it known that we, EDWIN B. SMITH and ALBERT H. LOUCKS, citizens of the United States, residing at Marion, in the county of Grant, State of Indiana, have invented a new and useful Lubricator, of which the following is a specification.

This invention relates to reversible clutches, it being the primary object of the invention to provide a clutch of a novel construction to permit the gears thereof to be automatically lubricated.

A further object of the invention is the provision of oil ducts and reservoirs, whereby the centrifugal force caused by the rotating clutch member will throw the oil to eliminate excessive oiling of the gears.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1:
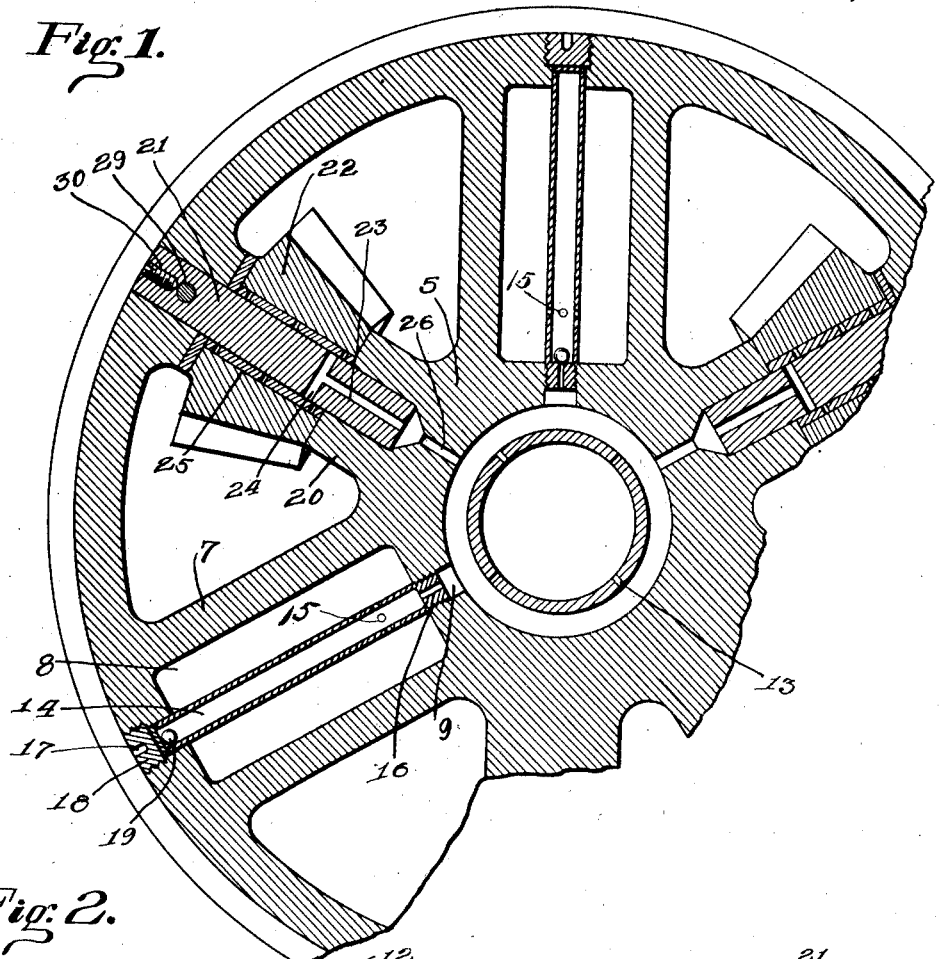
Figure 1 illustrates a fragmental sectional view of a reversible clutch element.
Figure 2:
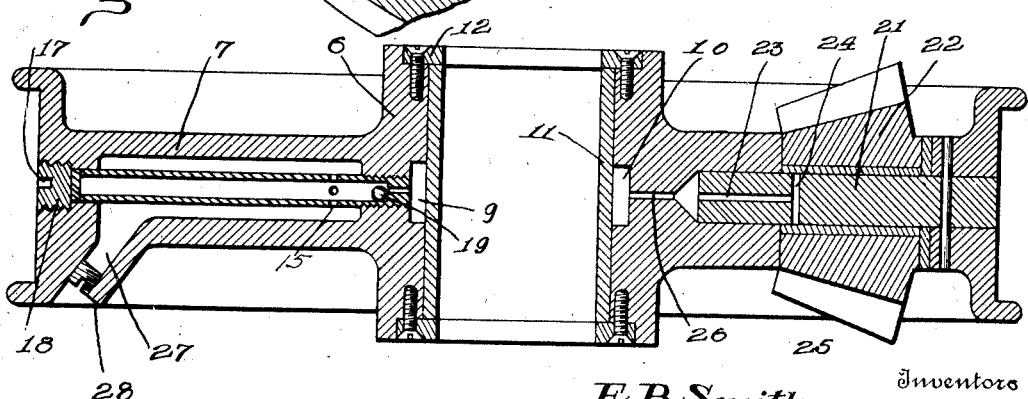
Fig. 2 illustrates a longitudinal sectional view through the clutch element.

Referring to the drawing in detail, the reference character 5 designates the brake wheel of the clutch, which is provided with a hub 6, and spokes 7 radiating therefrom, which spokes are exceptionally large and hollowed out to provide oil chambers 8, there being provided openings 9 at the bases of these oil chambers to provide communication between the oil chambers and a central oil passageway 10.

Positioned within the hub of the brake wheel is a bushing 11 which is secured in such position by means of the rings 12 which abut the ends of the bushing 11 and prevent lateral movement of the bushing within the hub, the bushing being also constructed to provide a wall for the passageway 10, to restrict the movement of oil therein.

This bushing 11 is provided with openings 13 which provide communication between the oil passageway 10 and the inner surface of the bushing 11, so that the lubricating fluid within the passageway 10 may pass through the openings 13 lubricating the shaft on which the wheel is supported, and which is not shown in the present drawing.

Disposed in each of the oil chambers 8 is a supply tube 14 which is of a diameter less than the diameter of the chamber in which the same is supported, so that a quantity of lubricating fluid may be contained in the chambers 8 at all times, there being provided openings 15 at the base of the respective tubes 14 for permitting the oil within the chambers 8 to pass into the tubes, whereby the passageway 10 is supplied with predetermined quantities of fluid.

These tubes have threaded extremities 16 disposed in the threaded openings in the chambers 8 so that the tubes will be supported within the chambers against displacement. A cover 17 covers the outer end of each tube, which covers are held in position by means of the threaded plugs 18 which plugs may be readily removed to remove the covers 17 to accomplish the repairing of the tubes.

Supported within each tube 14 is a ball valve member 19, which ball valve member is designed to be thrown to the outer end of the tube in which the same is supported by the centrifugal force of the rotating brake wheel, but when the wheel is stopped, it is obvious that the ball valve will fall by gravity to the lower end of its tube, forcing a quantity of oil through the opening 16 of the tube 14, where the same passes into the oil passageway 10 but at the same time restricting the quantity of fluid passing into the passageway.

Arranged between the spokes, are the enlargements 20 which are provided with bores to accommodate the shafts 21, each shaft being designed to support a gear wheel 22, and as shown, these shafts 21 are provided with central bores 23 communicating with transverse bores 24 so that oil passing through the bores 23 may pass laterally to lubricate the bushings 25, the bores 23 being however supplied with fluid through the ducts 26, which in turn have communication with the oil passageway 10.

Each of the chambers 8 is provided with a lateral opening 27 which is closed by a threaded plug 28, and by means of which ducts, the chambers may be supplied with oil, eliminating the necessity of removing the supply tubes 14 to accomplish the filling of the chambers.

In order that the shafts 21, will be held against movement, a pin 29 passes through the upper end of each shaft, which pins are held against movement by means of the set screw 30.

From the foregoing it is obvious that when the ball valves 19 operate to force a quantity of oil into the passageways 10, the ball valves also fall to close the opening providing communication between the passageways and oil passageway 10 to restrict the quantity of oil passing to the passageway 10.

The oil not only lubricates the shaft on which the brake lever is supported, but at the same time directs a quantity of oil through the passageways 26, to lubricate the shafts 21.

Having thus described the invention, what is claimed as new is:—

1. In a reversible clutch, a wheel, said wheel having hollow spokes, a hub, said hub having an oil passageway formed therein, a bushing positioned in the hub and forming one wall of the oil passageway, said bushing having openings, gear wheels supported by the first mentioned wheel, means within the hollow spokes for forcing fluid into the oil passageway, and means to provide communication between the oil passageway and gear wheels to lubricate the same.

2. In a reversible clutch, a main wheel having a hub, hollow spokes radiating from the hub, a supply tube positioned within each spoke and having openings communicating with the interior thereof, said tubes having other openings, said hub having an oil passageway formed therein, said other openings providing communication between the tubes and oil passageway, shafts disposed between the hollow spokes, gear wheels supported by the shafts, means within the tubes for forcing fluid therefrom, and said shafts having openings to permit fluid to pass from the oil passageway to the surfaces of the shafts.

3. In a reversible clutch, a main wheel, said wheel having hollow spokes, a hub having a fluid passageway in communication with the hollow spokes, a bushing within the hub and having openings to permit fluid to pass from the fluid passageway, shafts disposed between the hollow spokes, a bushing on each shaft, a pinion mounted on each bushing, each of said shafts having an opening communicating with the fluid passageway, and means to force fluid from the hollow spokes.

4. In a reversible clutch, a main wheel, hollow spokes forming a part of the main wheel, a tube positioned in each hollow spoke, each tube having a removable cover at one end thereof, a plug for securing the cover in position, a hub forming a part of the wheel, said hub having an oil passageway in communication with the tubes, shafts supported between the spokes, said shafts having openings in communication with the oil passageway, gears supported on the shafts to be lubricated by the oil passing through the openings in the shafts, and means operating in each tube for forcing lubricating fluid into the passageway.

5. In a reversible clutch, a main wheel, hollow spokes forming a part of the wheel, a hub, said hub having an oil passageway formed therein, a bushing disposed within the hub and forming one wall of the oil passageway, a tube within each hollow spoke, means for removably supporting the tubes within the spokes, each tube having an opening to provide communication with the oil passageway, gears supported between the spokes, and a ball valve operating within each tube for forcing a quantity of fluid therefrom.

6. In a reversible clutch, a main wheel, hollow spokes forming a part of the wheel, said spokes providing oil chambers, means disposed within each spoke for forcing fluid therefrom, a hub forming a part of the main wheel, said hub having an oil passageway formed therein, shafts supported between the spokes, said shafts having means to permit fluid to pass therethrough, and means for removably securing the shafts to the wheels.

In testimony that we claim the foregoing as our own, we have hereto affixed our signatures in the presence of two witnesses.

EDWIN B. SMITH.
ALBERT H. LOUCKS.

Witnesses:
DONALD E. MARTIN,
EDWARD BEAL.